(12) United States Patent
Song et al.

(10) Patent No.: US 10,971,143 B2
(45) Date of Patent: Apr. 6, 2021

(54) INPUT DEVICE, ELECTRONIC DEVICE, SYSTEM COMPRISING THE SAME AND CONTROL METHOD THEREOF

(71) Applicant: Samsung Electronics Co., Ltd., Suwon-si (KR)

(72) Inventors: Ki-hyun Song, Suwon-si (KR); Je-hwan Seo, Daegu (KR); Suk-hoon Yoon, Yongin-si (KR); Jong-keun Lee, Seoul (KR); Chae-young Lim, Bucheon-si (KR); Min-sup Kim, Suwon-si (KR); Hyun-kyu Yun, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/046,345

(22) Filed: Jul. 26, 2018

(65) Prior Publication Data

US 2019/0103108 A1    Apr. 4, 2019

(30) Foreign Application Priority Data

Sep. 29, 2017  (KR) .......................... 10-2017-0128076

(51) Int. Cl.
*G10L 15/22*         (2006.01)
*G10L 15/18*         (2013.01)
(Continued)

(52) U.S. Cl.
CPC .............. *G10L 15/22* (2013.01); *G01S 17/04* (2020.01); *G01S 17/08* (2013.01); *G01S 17/88* (2013.01);
(Continued)

(58) Field of Classification Search
CPC ..... G10L 15/22; G10L 15/30; G10L 15/1815; G10L 2015/223; G06F 3/167; G01S 17/08
(Continued)

(56) References Cited

U.S. PATENT DOCUMENTS

2003/0078784 A1*  4/2003  Jordan ............... H04N 21/4221
                                                                 704/275
2007/0299670 A1* 12/2007  Chang ................ G07C 9/00087
                                                                 704/275

(Continued)

FOREIGN PATENT DOCUMENTS

EP      2778865      9/2014
EP      3007059      4/2016

(Continued)

OTHER PUBLICATIONS

International Search Report and Written Opinion of the International Searching Authority dated Jan. 10, 2019 in International Patent Application No. PCT/KR2018/011513.

(Continued)

*Primary Examiner* — Thierry L Pham
(74) *Attorney, Agent, or Firm* — Staas & Halsey LLP

(57) ABSTRACT

An input device which includes a sensor, a microphone, a communicator, and a processor configured to, based on an operation of a user being identified based on a value sensed through the sensor, transmit utterance intention sensing information to an electronic device, based on a command to initiate a speech recognition and feedback information being received from the electronic device according to the utterance intention sensing information transmitted to the electronic device, activate the microphone and provide a feed- (Continued)

back according to the feedback information, and transmit a voice signal received via the microphone to the electronic device.

17 Claims, 17 Drawing Sheets

(51) Int. Cl.
    *G10L 15/30*     (2013.01)
    *G06F 3/16*     (2006.01)
    *G01S 17/08*     (2006.01)
    *G01S 17/88*     (2006.01)
    *G01S 17/04*     (2020.01)

(52) U.S. Cl.
    CPC .......... *G06F 3/167* (2013.01); *G10L 15/1815* (2013.01); *G10L 15/30* (2013.01); *G10L 2015/223* (2013.01)

(58) Field of Classification Search
    USPC ........................................................ 704/257
    See application file for complete search history.

(56) References Cited

U.S. PATENT DOCUMENTS

| | | | |
|---|---|---|---|
| 2013/0160052 A1* | 6/2013 | Ure | H04N 7/17318 725/34 |
| 2014/0136867 A1 | 5/2014 | Yamamoto | |
| 2014/0214430 A1 | 7/2014 | Wang | |
| 2015/0100322 A1* | 4/2015 | Lee | H04N 5/4403 704/275 |
| 2015/0206529 A1* | 7/2015 | Kwon | G10L 17/22 704/246 |
| 2015/0331668 A1 | 11/2015 | Huang et al. | |
| 2016/0112554 A1 | 4/2016 | Shintani | |
| 2016/0248899 A1 | 8/2016 | Lee et al. | |
| 2017/0025122 A1 | 1/2017 | Choi | |
| 2019/0130898 A1* | 5/2019 | Tzirkel-Hancock | G10L 15/22 |
| 2019/0237096 A1* | 8/2019 | Trella | G10L 25/51 |
| 2019/0355380 A1* | 11/2019 | Hatfield | H03G 3/001 |
| 2019/0371332 A1* | 12/2019 | Yu | G10L 15/22 |
| 2019/0385605 A1* | 12/2019 | Kim | G06N 20/00 |

FOREIGN PATENT DOCUMENTS

| | | |
|---|---|---|
| JP | 3950825 | 8/2007 |
| JP | 2013-3911 | 1/2013 |
| JP | 2015-12301 | 1/2015 |
| KR | 10-2015-0019646 | 2/2015 |
| KR | 10-2015-0086926 | 7/2015 |
| KR | 10-2015-0114983 | 10/2015 |
| KR | 10-2015-0010494 | 2/2017 |

OTHER PUBLICATIONS

Extended European Search Report dated Mar. 30, 2020 in European Patent Application No. 18861444.0.

* cited by examiner

< FEEDBACK INDICATING STATE IN WHICH SPEECH RECOGNITION IS AVAILABLE >

< FEEDBACK INDICATING STATE IN WHICH USER UTTERANCE IS MAINTAINED >

< FEEDBACK INDICATING STATE IN WHICH SPEECH RECOGNITION IS NOT AVAILABLE >

INPUT DEVICE, ELECTRONIC DEVICE, SYSTEM COMPRISING THE SAME AND CONTROL METHOD THEREOF

CROSS-REFERENCE TO RELATED APPLICATION

This application is based on and claims priority under 35 U.S.C. § 119 to Korean Patent Application No. 10-2017-0128076, filed in the Korean Intellectual Property Office on Sep. 29, 2017, and the disclosure of which is incorporated herein by reference in its entirety.

BACKGROUND

1. Field

Apparatuses and methods consistent with example embodiments relate to an input device which controls an electronic device, the electronic device, a system comprising the same, and a control method thereof.

2. Description of Related Art

In general, for a related art input device (e.g., a remote controller) which is capable of speech recognition, in order to control an electronic device, it is necessary for the user to press a speech recognition button, and utter while the pressing operation is maintained. Thereafter, the speech recognition may be ended by removing a hand from the speech recognition button.

However, in a case in which the utterance is started at the same time as when the speech recognition button is pressed, it is highly possible that the initial sound is not input. In addition, when a hand is removed from the speech recognition button before the utterance ends, the input device could not recognize a complete sentence, and thus there is a problem that an error occurs in speech recognition.

In addition, a related art remote controller in general is designed in a stick form and thus, there is an inconvenience that the user has to point the remote controller toward the direction of the electronic device to be controlled.

SUMMARY

One or more example embodiments provide an input device which initiates speech recognition by a particular user operation and transmits a voice signal received from the user to an electronic device, the electronic device, a system comprising the same, and a control method thereof.

According to an aspect of an example embodiment, there is provided an input device, comprising: a sensor; a microphone; a communicator; and a processor configured to, based on an operation of a user being identified based on a value sensed through the sensor, transmit utterance intention sensing information to an electronic device, based on a command to initiate a speech recognition and feedback information being received from the electronic device according to the utterance intention sensing information transmitted to the electronic device, activate the microphone and provide a feedback according to the feedback information, and transmit a voice signal received via the microphone to the electronic device.

The operation may be a hovering operation. The processor may deactivate the microphone after the voice signal is transmitted to the electronic device, or when no additional voice signal is received for a predetermined time after the voice signal is received.

The processor may activate the microphone, after the microphone has been deactivated, based on information indicating necessity of additional voice signal to perform the speech recognition being received from the electronic device.

The processor may, based on the information indicating necessity of the additional voice signal and corresponding feedback information being received from the electronic device, provide a feedback requesting an additional utterance based on the received corresponding feedback information.

The sensor may include at least one light output member and a light intensity measuring member.

The processor may control the at least one light output member to output light and identify the operation based on a reflected amount of the output light measured via the light intensity measuring member.

The feedback provided may indicate at least one of a state in which the speech recognition is available, a state in which an utterance of the user is maintained, and a state in which the speech recognition is unavailable.

The feedback information may include different feedback information corresponding to each of a state in which the speech recognition is available, a state in which an utterance of the user is maintained, and a state in which the speech recognition is unavailable.

The processor may provide different feedback corresponding to each of the states.

The feedback information may include at least one of a type of feedback, a pattern according to the type of the feedback, and an intensity according to the type of the feedback.

According to an aspect of an example embodiment, there is provided a method to control an input device. The method comprising transmitting utterance intention sensing information to an electronic device based on an operation of the user being identified based on a value sensed through a sensor; activating a microphone and providing a feedback based on a command to initiate a voice recognition and feedback information being received from the electronic device according to the utterance intention sensing information transmitted to the electronic device, the feedback provided being based on the feedback information from the electronic device; and transmitting a voice signal received via the microphone to the electronic device.

The operation may be a hovering operation by the user. The method may further include deactivating the microphone after the voice signal is transmitted to the electronic device, or when no additional voice signal is received for a predetermined time after the voice signal is received.

The method may further include activating the microphone, after the microphone has been deactivated, based on information indicating necessity of an additional voice signal to perform the voice recognition being received from the electronic device.

The method may further include providing a feedback requesting an additional utterance based on corresponding feedback information received from the electronic device, based on the information indicating necessity of the additional voice signal and the corresponding feedback information being received from the electronic device.

The transmitting the utterance intention sensing information may include outputting light, and identifying the operation based on a reflected amount of the output light.

The feedback provided may indicate at least one of a state in which the voice recognition is available, a state in which an utterance of the user is maintained, and a state in which the voice recognition is unavailable.

The feedback information may include different feedback information corresponding to each of a state in which the voice recognition is available, a state in which an utterance of the user is maintained, and a state in which the voice recognition is un available.

The providing the feedback may include, based on the feedback information, providing different feedback corresponding to each state.

The feedback information may include at least one of a type of feedback, a pattern according to the type of the feedback, and an intensity according to the type of feedback.

According to an aspect of an example embodiment, there is provided a system including an input device and an electronic device. The system comprising: an input device configured to, based on an operation of a user being identified based on a value sensed through a sensor, transmit utterance intention sensing information to the electronic device; and an electronic device configured to, based on the utterance intention sensing information being received from the input device, transmit a command to initiate a speech recognition and feedback information to the input device.

The input device may, based on the command and the feedback information being received from the electronic device, activate a microphone, provide a feedback according to the feedback information, and transmit a voice signal received via the microphone to the electronic device.

According to the various example embodiments described above, it is possible to initiate speech recognition of the input device with only a simple operation and control the electronic device based on the voice signal. In addition, the user can be aware of a state in which the speech recognition is possible according to a feedback pattern provided by the input device, and thereby the user convenience is enhanced.

BRIEF DESCRIPTION OF THE DRAWINGS

The above and/or other aspects will become more apparent by reference to example embodiments which are illustrated in the appended drawings. Understanding that these drawings depict only example embodiments and are not therefore to be considered to be limiting of the scope of the disclosure, the principles herein are described and explained with additional specificity and detail via the use of the accompanying drawings, in which.

DETAILED DESCRIPTION

Figure 1:
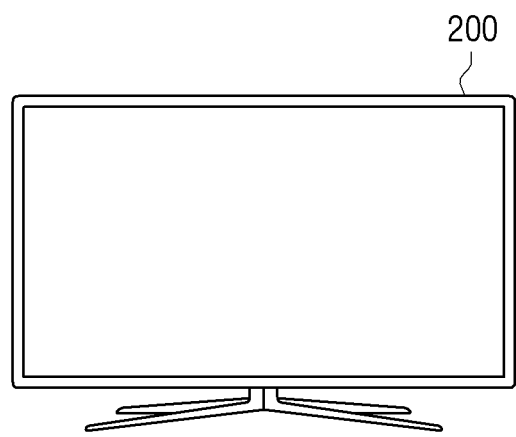
FIG. 1 is a diagram illustrating a system including an input device and an electronic device, according to an example embodiment.
Figure 1:
Figure 1:
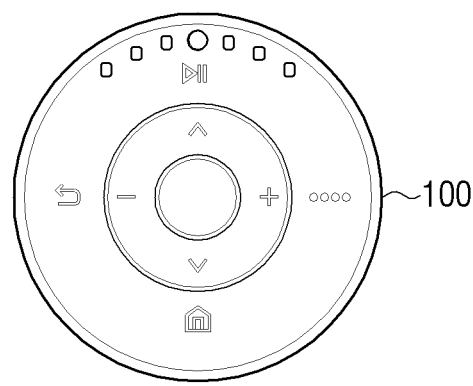

Below, exemplary embodiments will be described in detail with reference to the accompanying drawings. For reference, when it is determined that the detailed description of the known function or configuration may obscure the gist of the embodiments in describing them, the detailed description thereof will be omitted. In addition, the exemplary embodiments may be changed in various forms, and therefore, the technical scope is not limited to the following exemplary embodiments. Rather, these exemplary embodiments are provided to make the present disclosure thorough and complete.

Unless explicitly described otherwise, the term 'including' will be understood to imply the inclusion of a component, but not the exclusion of any other components. Further, various elements and areas in the drawings are schematically drawn. Therefore, the technical ideas are not limited by a relative size or interval drawn in the accompanying drawings.

Hereinafter, embodiments of the present disclosure will be explained with reference to the drawings.

FIG. 1 is a diagram illustrating a system 10 including an input device and an electronic device, according to an example embodiment.

The input device 100 provides a function capable of controlling the electronic device 200. The input device 100 may be, for example, implemented as a remote controller. However, the example is not limited thereto, and any device which is capable of speech recognition may be applied. For example, the input device 100 may be implemented as a smartphone, a tablet, a PC, and the like.

The electronic device 200 may be implemented such that it may be controlled by the input device 100. For example, the electronic device 200 may be implemented as a TV. However, the example is not limited thereto, and any device which is capable of being controlled by the input device 100 may be applied. For example, the electronic device may also be implemented as various home appliances, such as an air conditioner, a PC, a speaker, a washing machine, and the like, various medical instrument, and the like.

According to an example embodiment, the input device 100 may, for the user convenience, control the electronic device 200 by initiating speech recognition by a particular user operation including a hovering operation and transmitting a voice signal received from the user to the electronic device 200. The various example embodiments of the present disclosure will be described in greater detail below with reference to the drawings.

Figure 2:
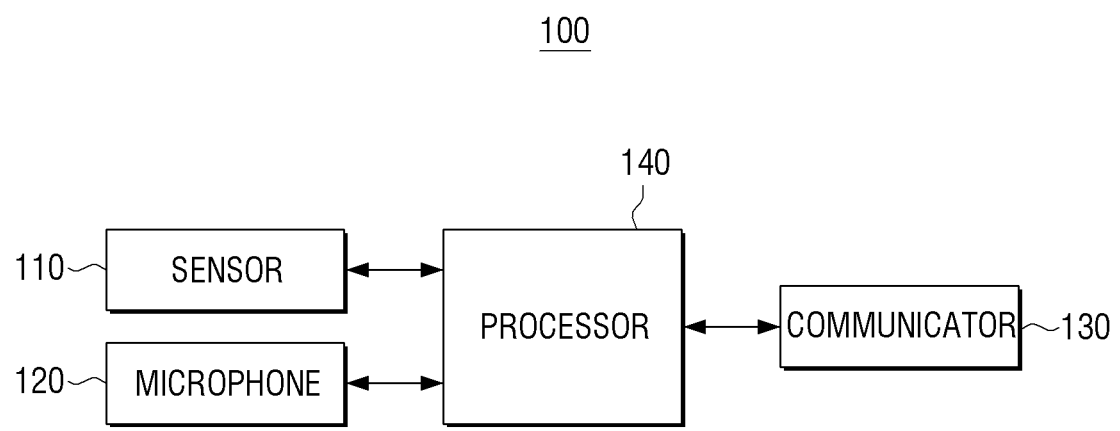
FIG. 2 is a block diagram illustrating a configuration of the input device, according to an example embodiment.

FIG. 2 is a block diagram illustrating a configuration of the input device, according to an example embodiment.

Referring to FIG. 2, the input device 100 includes a sensor 110, a microphone 120, a communicator 130, and a processor 140.

The sensor 110 may detect a user operation. The sensor 110 may include a light output unit 112 and a light intensity measuring unit 114.

The light output unit 112 may output light. The light output unit 112 may include at least one light source. For example, the light output unit 112 may include at least one infrared ray (IR) light source which outputs IR, but is not limited thereto. The light output unit 112 may periodically output light.

The light intensity measuring unit 114 may measure an intensity of light that returns by reflecting the light output from the light output unit 112. For example, the light intensity measuring unit 114 may include at least one light intensity measuring sensor.

For example, in a state in which light is output from the light output unit 112, when a user's hand approaches to the input device 100, the output light may be reflected by the user's hand. The light intensity measuring unit 114 may be reflected this way and measure the intensity of light that enters the input device 100. At least one light intensity measuring unit 114 may be provided. The light output unit 112 may include a plurality of light sources. The light intensity measuring unit 114 may include a plurality of light intensity measuring sensors corresponding to a plurality of light sources. The light output unit 112 and the light intensity measuring unit 114 may be implemented as a single integrated circuit (IC) chip.

The microphone 120 may receive sound that is generated outside. At least one microphone 120 may be provided.

The communicator 130 includes communication circuitry that performs communications with the electronic device 200. Herein, the communicator 130 may perform wireless communication with the electronic device 200 according to the communication methods such as Bluetooth (BT), Wireless Fidelity (WI-FI), Zigbee, and Infrared (IR), but may also perform the communication with the electronic device 200 according to the various communication methods such as Serial Interface, Universal Serial Bus (USB), and Near Field Communication (NFC).

For example, if a predetermined event occurs, the communicator 130 may communicate with the electronic device 200 according to a predetermined communication method and may be interlocked with the electronic device 200. Herein, the interlocked state may be a state where communication between the input device 100 and the electronic device 200 is initiated, where network is being formed, or where a device pairing is being performed. For example, device identification information of the electronic device 200 may be provided to the input device 100. As a result, a pairing process between two apparatuses may be performed. For example, when the preset event occurs in the input device 100 or the electronic device 200, the communicator 130 may search for peripheral devices through, for example, a digital living network alliance (DLNA) technology and may perform a pairing with the found device to be in the interlocked state.

The processor 140 may control the overall operations of the input device 100.

According to an example embodiment, the processor 140 may be implemented as a digital signal processor (DSP) for processing digital signals, a microprocessor, and a time controller (TCON). However, the example is not limited thereto. The processor 140 may include one or more from among various processing circuitry, such as, for example, and without limitation, one or more of a dedicated processor, a central processing unit (CPU), a micro controller unit (MCU), a micro processing unit (MPU), a controller, application processor (AP), communication processor (CP), or an ARM processor, or may be defined the corresponding term. In addition, the processor 140 may be implemented as a System on Chip (SoC) in which a processing algorithm is mounted and a large scale integration (LSI), and may also be implemented in the form of a field programmable gate array (FPGA).

When a hovering operation is identified based on a sensing value sensed through the sensor 110, the processor 140 may transmit utterance intention sensing information to the electronic device 200. The hovering operation of the present invention refers to an operation of maintaining a hovering state in which an object (e.g., a user's hand) is in the vicinity of the input device 100 for a predetermined time. However, the user's operation for transmitting the utterance intention sensing information to the electronic device 200 is not limited to the hovering operation, and it may be a swiping operation or a touch operation. In this regard, the utterance intention sensing information is information indicating that a user's utterance may be started.

The processor 140 may identify a hovering operation or a swiping operation based on a light intensity value measured in the light intensity measuring unit 114. When it is determined that the object has approached the input device 100 based on a value measured in the light intensity measuring unit 114, the processor 140 may reduce an output cycle of light.

The processor 140 may store information relating to a time point at which a light intensity value measured in the light intensity measuring unit 114 reaches a predetermined value or more. Thereafter, the processor may store information relating to a time point at which a light intensity value measured in the light intensity measuring unit 114 is less than a predetermined value.

For example, it will be assumed that the light output unit 112 includes a plurality of light sources, and that the light intensity measuring unit 114 includes a plurality of light intensity measuring sensors corresponding to the plurality of light sources. In this regard, in a case in which a light intensity value measured in each of the plurality of light intensity measuring sensors is a predetermined value or more and thereafter, a light intensity value measured in at least one of the plurality of light intensity measuring sensors maintains a predetermined value or more, the processor 140 may identify the corresponding operation as a hovering operation.

For example, in a case in which a user's hand is approached to the input device 100, when a light intensity value measured in each of a plurality of light intensity measuring sensors is a predetermined value or more due to an area of the hand and thereafter, the hand is held in the vicinity of the input device 100 and a state in which a light intensity value measured in at least one light intensity measuring sensor is a predetermined value or more is maintained for a predetermined time (e.g., a second), the processor 140 may identify the corresponding operation as a hovering operation. The example described above takes into consideration a case where a light intensity is measured to be less than a predetermined value in at least one light intensity measuring sensor due to movement of the user's hand during hovering.

In addition, when a light intensity value measured in each of a plurality of light intensity measuring sensors is at least a predetermined value, thereafter, a light intensity value measured in each of the plurality of light intensity measuring sensors is less than a predetermined value, and a time difference between a time point at which a light intensity value becomes a predetermined value or more and a time point at which a measured light intensity value becomes less than a predetermined value is less than or equal to a predetermined time (e.g., one second), the corresponding operation may be identified as a swiping operation.

For example, in a case in which a user's hand has approached the input device 100 and a light intensity value measured in each of a plurality of light intensity measuring sensors is at least a predetermined value and thereafter, the hand is moved away from the input device 100 within a predetermined time and a light intensity value measured in each of the plurality of light intensity measuring sensors is less than a predetermined value, the processor 140 may identify the corresponding operation as a swiping operation.

If a plurality of light intensity measuring sensors are present, the processor 140 may determine that an object is approaching from a direction of the light intensity measuring sensor in which the measured light intensity is increased for the first time. In addition, the processor 140 may determine that the object is moved farther away toward a direction of the light intensity measuring sensor in which an increased light intensity is finally reduced in the light intensity measuring sensor.

However, a method for identifying a hovering operation and a swiping operation is not limited thereto.

The processor 140 may identify a touch operation through a touch sensor 160. The processor 140 may collect contact status data between an object and the touch sensor 160 from the touch sensor 160. When it is determined that the object is in contact with the touch sensor 160 based on the collected data, the processor 140 may determine whether a motion sensing signal has been received from a motion sensor 150. In a case in which a motion sensing signal has been received, the processor 140 may identify a user's operation with respect to the input device 100 as a grip operation, not a touch operation. In a case in which a motion sensing signal has not been received, the processor 140 may identify a user's operation with respect to the input device 100 as a touch operation.

When a speech recognition initiation command and feedback information is received, the processor 140 may activate the microphone 120 and provide feedback according to the feedback information. In this regard, the speech recognition initiation command may be a signal to activate the microphone 120. The feedback information may be information required to provide feedback information informing that a speech recognition is available.

The processor 140 may provide feedback according to the feedback information to the user by using various methods. For example, the feedback may be in the form of vibrating the input device 100 or outputting a particular sound or voice. Alternatively, the feedback may be in the form that an LED light source emits light. To distinguish between feedback indicating that a speech recognition is available and feedback indicating another state, it is possible to differently set an intensity of vibration, a sound volume, contents of the speech, and a pattern emitted from the LED source and provide different feedback corresponding to each of the states.

The processor 140 may transmit a voice signal received through the microphone 120 to the electronic device 200. In this regard, the voice signal may be a record data recorded via the microphone 120. For example, in a case in which the user utters a speech "MBC", the utterance may be recorded via the microphone and the recorded data may be transmitted to the electronic device 200. However, the example is not limited thereto, and the processor 140 may analyze the speech "MBC" uttered by the user and transmit the corresponding signal to the electronic device 200.

The processor 140 may transmit a voice signal to the electronic device 200 and then, deactivate the microphone 120. Alternatively, in a case in which an additional voice signal has not been received for a predetermined time after the voice signal is received, the processor 140 may deactivate the microphone 120. In this regard, the deactivation may end only the microphone 120 or may end the microphone 120 and then, convert a mode from an active mode to a sleep mode which is a low power mode.

According to an example embodiment, the processor 140 may analyze a speech uttered by the user, and when it is determined that the analyzed speech is a voice signal capable of controlling the electronic device 200, transmit a signal corresponding to the speech to the electronic device 200 and then, deactivate the microphone 120. For example, when the user utters a speech "MBC", the processor 140 may analyze "MBC", and when it is determined that the "MBC" is a voice signal capable of controlling a broadcast channel of the electronic device 200, transmit a channel change signal corresponding to the "MBC" channel and deactivate the microphone 120. Alternatively, when the user utters only a speech "M", the processor 140 may analyze "M", and when it is determined that the "M" is a voice signal incapable of controlling the electronic device 200, maintain an active state of the microphone 120 for a predetermined time, and when an additional voice signal is not received for the predetermined time, deactivate the microphone 120.

According to another example embodiment, the processor 140 may initiate sound recording and record a speech uttered by the user, and when an additional voice signal is not received from a predetermined time from when a speech received in the microphone 120 becomes less than a predetermined decibel, that is, a sound of over a predetermined decibel is not detected, determine that the user's utterance has been ended. When it is determined that the user's utterance has been ended, the processor 140 may transmit recording data to the electronic device 200 and then, deactivate the microphone 120.

After the microphone 120 is deactivated, the processor 140 may activate the microphone 120 when it receives information indicating the necessity to receive an additional voice signal from the electronic device 200. For example, when the user utters only a speech "news channel", the processor 140 may transmit a voice signal corresponding to "news channel" to the electronic device 200. If additional information for displaying one channel is required since a plurality of channels in the electronic device 200 correspond to "news channel", the processor 140 may receive from the electronic device 200 information indicating that it is necessary to receive an additional voice signal. The processor 140 may activate the microphone 120 when the corresponding information is received.

When information indicating that it is necessary to receive an additional voice signal and the corresponding feedback information are received from the electronic device 200, the processor 140 may provide feedback requesting an additional utterance based on the received feedback information. In this regard, the feedback information may be identical to information indicating a state in which the speech recognition is available according to a hovering operation, a swiping operation or a touch operation, but may be different from the above-described information indicating that the speech recognition is available to notify that it is a situation in which an additional speech recognition is necessary.

To distinguish between feedback indicating that a speech recognition is available and feedback indicating a situation in which an additional speech recognition is necessary, the processor 140 may differently set an intensity of vibration, a sound volume, contents of the speech, and a pattern emitted from the LED source and provide different feedback corresponding to each of the states.

The processor 140 may control the light output unit 112 to output light, and identify a hovering operation based on a reflected amount of light measured through the light intensity measuring unit 114.

For example, it will be assumed that the light output unit 112 includes a plurality of light sources, and that the light intensity measuring unit 114 includes a plurality of light intensity measuring sensors corresponding to the plurality of light sources. In this regard, in a case in which a user's hand approaches the input device and a light intensity value measured in each of the plurality of light intensity measuring sensors is greater than or equal to a predetermined value, and thereafter, the hand is held in the vicinity of the input device 100 and a light intensity value measured in at least one of the plurality of light intensity measuring sensors maintains to be greater than or equal to a predetermined value, the processor 140 may identify the corresponding operation as a hovering operation.

In a case in which the light output unit 112 includes a plurality of light sources and the light intensity measuring unit 114 includes a plurality of light intensity measuring sensors corresponding to the plurality of light sources, when a user's hand has approached the input device 100 and a light intensity value measured in each of a plurality of light intensity measuring sensors is at least a predetermined value and thereafter, the hand is moved away from the input device 100 within a predetermined time and a light intensity value measured in each of the plurality of light intensity measuring sensors is less than a predetermined value, the processor 140 may identify the corresponding operation as a swiping operation.

The processor 140 may provide, based on the feedback information received from the electronic device 200, feedback indicating at least one of a state in which the speech recognition is available, a state in which the user's utterance is maintained, and a state in which the speech recognition is unavailable. In this regard, the feedback information may include different information corresponding to each of the state in which the speech recognition is available, a state in which the user's utterance is maintained, and a state in which the speech recognition is unavailable.

The state in which the speech recognition is available may refer to a state in which the speech recognition is available according to a hovering operation, swiping operation or touch operation of the user, or may refer to a state in which the speech recognition is available according to information indicating a situation in which it is necessary to receive an additional voice signal received from the electronic device 200. The processor 140 may, in a state in which the speech recognition is available, distinguish between a state in which the speech recognition is available by a hovering operation, a swiping operation, or a touch operation and a state in which the speech recognition is available according to information indicating a situation where it is necessary to receive an additional voice signal, and may provide different feedback. However, the example is not limited thereto. If the voice recognition is available, the same feedback may be provided.

The processor 140 may provide different feedback corresponding to each state based on the feedback information. The feedback information may include at least one of a type of feedback, a pattern according to a feedback type, and an intensity according to a feedback type. In this regard, the type of feedback refers to a vibration of the input device 100, output of a voice or a sound, or light emission of an LED light source from the feedback providing unit 190. The pattern according to the feedback type may be a light emission pattern of an LED light source in the feedback providing unit 190, and the intensity of the feedback type may refer to an intensity of sound being output or an intensity of an LED signal being output. In this regard, the processor 140 may receive from the electronic device 200 feedback information itself, including a type of feedback, a pattern according to the feedback type, and an intensity according to the feedback type. However, the example is not limited thereto, and the feedback information may be stored in the storage 170 and the processor 140 may receive from the electronic device 200 a signal instructing a particular feedback to be provided.

For example, when the feedback providing unit 190 is provided in the input device 100, the processor 140 may control an LED light source of the feedback providing unit 190 to emit light according to a particular pattern to indicate a state in which the speech recognition is available according to a hovering operation, a swiping operation, or a touch operation, and may control a particular LED light source of the feedback providing unit to emit light to indicate a state in which the speech recognition is available according to information indicating a situation where it is necessary to receive the received additional voice signal.

In addition, the processor 140 may, to indicate a state in which a user's utterance is maintained, repeat a pattern that a plurality of LED light sources sequentially emit light, stop emitting light, and emit light again while the user's utterance is maintained. In this regard, the processor 140 may, in a case in which a voice received through the microphone 120 is greater than or equal to a predetermined decibel, determine that the user utters, and determine that the user's utterance is maintained until the voice maintains to be less than the predetermined decibel for a predetermined time.

In addition, the processor 140 may not control each of a plurality of LED light sources not to emit light to indicate a state in which the speech recognition is not available. In this regard, the state in which the speech recognition is unavailable may be a case where a user operation to initiate the voice recognition in the input device 100 and it is not necessary to receive an additional voice signal. Accordingly, it may be a state in which the microphone 120 is deactivated.

Hereinabove, it is described that an LED light source that emits light in the feedback providing unit 190 is an example of feedback. However, feedback may, of course, be provided in the form according to vibration, voice or speech output of the input device 100.

Figure 3A:
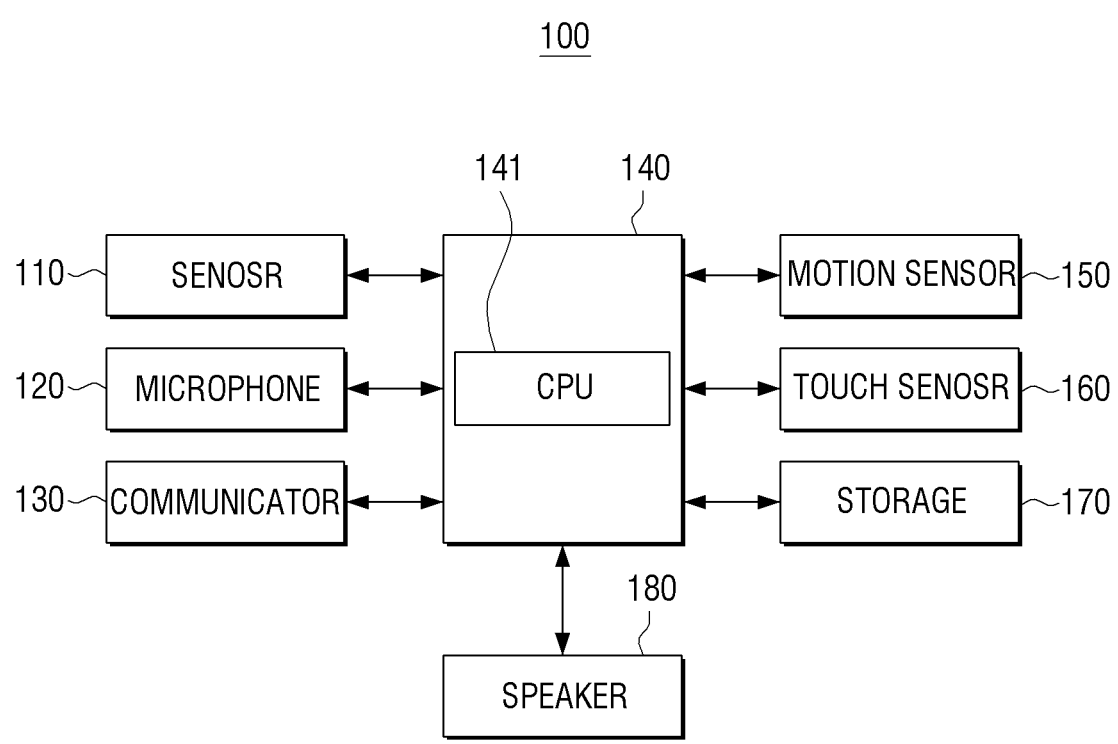
FIGS. 3A-3C are a block diagram of a detailed configuration of an example input device of FIG. 2 and a diagram illustrating an example input device.
Figure 3B:
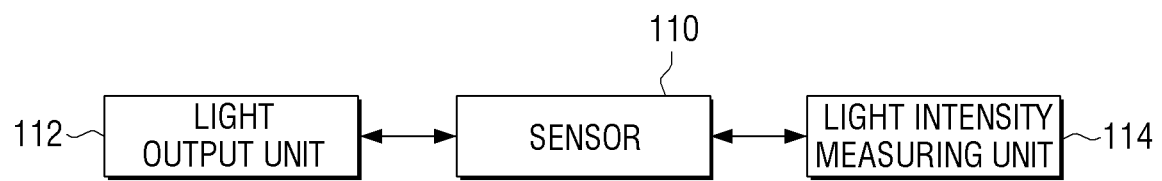
Figure 3C:
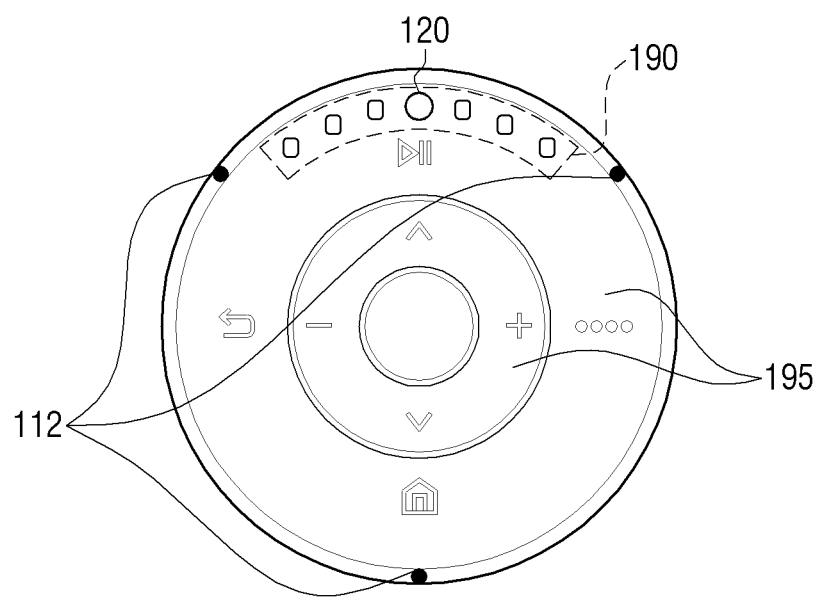

FIGS. 3A-3C are a block diagram of a detailed configuration of an example input device of FIG. 2 and a diagram illustrating an example input device.

FIG. 3A is a diagram illustrating a detailed configuration of the input device 100.

Referring to FIG. 3A, the input device 100 includes a sensor 110, a microphone 120, a communicator 130, a processor 140, a motion sensor 150, a touch sensor 160, and a storage 170. The elements of FIG. 3A overlapped with the elements of FIG. 2 will not be specifically explained below.

The processor 140 may include, for example, and without limitation, a CPU 141, a ROM (or a non-volatile memory) in which a control program for controlling the input device 100 is stored and a RAM (or volatile memory) used to store data input from outside of the input device 100 or used as a storage area corresponding to various operations performed in the input device 100.

The CPU 141 accesses the storage 170 and performs various operations using various programs, data, and the like stored in the storage 170.

The motion sensor 150 may measure data for sensing whether the user grips the input device 100. The motion sensor 150 may measure an acceleration and an angular speed to sense whether the input device 100 is gripped. The motion sensor 150 may include an acceleration sensor and a gyroscope sensor. The motion sensor 150 may sense a start position and a current position of a motion of the input device 100 and measure velocity changes and position changes by using six axes of the acceleration sensor and the gyroscope sensor.

The acceleration sensor may sense a gravity direction. Also, the acceleration sensor may sense a gradient in an immovable state. The acceleration sensor senses changes in a speed with respect to a unit time. The acceleration sensor may be realized as three axes. If the acceleration sensor is realized as a triaxial acceleration sensor, the acceleration sensor includes X, Y, and Z acceleration sensors that are disposed in different directions to be orthogonal to one another.

The acceleration sensor respectively converts output values of the X, Y, and Z acceleration sensors into digital values and provides the digital values for a preprocessor. Here, the preprocessor may include a chopping circuit, an amplifier circuit, a filter, an analog-to-digital converter (ADC), and the like. Therefore, the preprocessor chops, amplifies, and filters an electrical signal output from the triaxial acceleration sensor, and converts the electrical signal into a digital voltage value.

The gyro sensor is an element that senses angular speed by sensing changes in a preset direction of the input device 100 for a unit time. The gyro sensor may be a gyroscope having three axes. The gyro sensor may analyze an angle through a definite integral value of a sensed angular speed.

The touch sensor 160 may include a capacitive sensor or a resistive sensor. In particular, the capacitive sensor calculates a touch coordinates by sensing micro-electricity excited by a user body when part of the user body touches a surface of the input device 100 using a dielectric coated on the display surface.

The storage 170 may store various data or programs which are used to drive and control the input device 100. In addition, the storage 170 may store voice data received via the microphone 120.

The speaker 180 functions to output an audio signal. For example, the speaker 140 may include at least one speaker unit (or audio amplifier) capable of outputting audio signals. In particular, the speaker 180 may provide voice feedback or acoustic feedback. For example, the speaker 180 may provide a voice or sound that indicates a state in which the speech recognition is available, a state in which a user's utterance is maintained, and a state in which the speech recognition is unavailable.

FIG. 3B is a diagram illustrating a detailed configuration of the sensor 110.

Referring to FIG. 3B, the sensor 110 may be communicatively coupled to a light output unit 112 and a light intensity measuring unit 114. According to an embodiment, the sensor 110 may include a light output unit 112 and a light intensity measuring unit 114.

The light output unit 112 may output light. The light output unit 112 may include at least one light source. For example, the light output unit 112 may include at least one infrared ray (IR) light source which outputs IR, but is not limited thereto. The light output unit 112 may periodically output light.

The light intensity measuring unit 114 may measure an intensity of light that returns by reflecting the light output from the light output unit 112. For example, in a state in which light is output from the light output unit 112, when a user's hand approaches to the input device 100, the output light may be reflected by the user's hand. The light intensity measuring unit 114 may include at least one light intensity measuring sensor. The light output unit 112 and the light intensity measuring unit 114 may be implemented as a single integrated circuit (IC) chip.

FIG. 3C is a diagram illustrating an example input device 100.

The input device 100 may include a light output unit 112, a microphone 120, a feedback providing unit 190, and a button unit 195. The elements of FIG. 3C overlapped with the elements of FIGS. 2 and 3A will not be specifically explained below.

The feedback providing unit 190 may include a plurality of LED light sources.

In this regard, the processor 140 may control a plurality of LED light sources to emit light in various patterns based on feedback information received from the electronic device 200.

For example, in a state in which the speech recognition is available, the processor 140 may control a plurality of LED light sources to sequentially emit light from an LED light source adjacent to the microphone 120, and thereafter, control only a particular LED light source to emit light.

The button unit 195 may include a channel change button, a volume button, a menu button, a play/pause button, and a return button. However, the example is not limited thereto.

Figure 4:
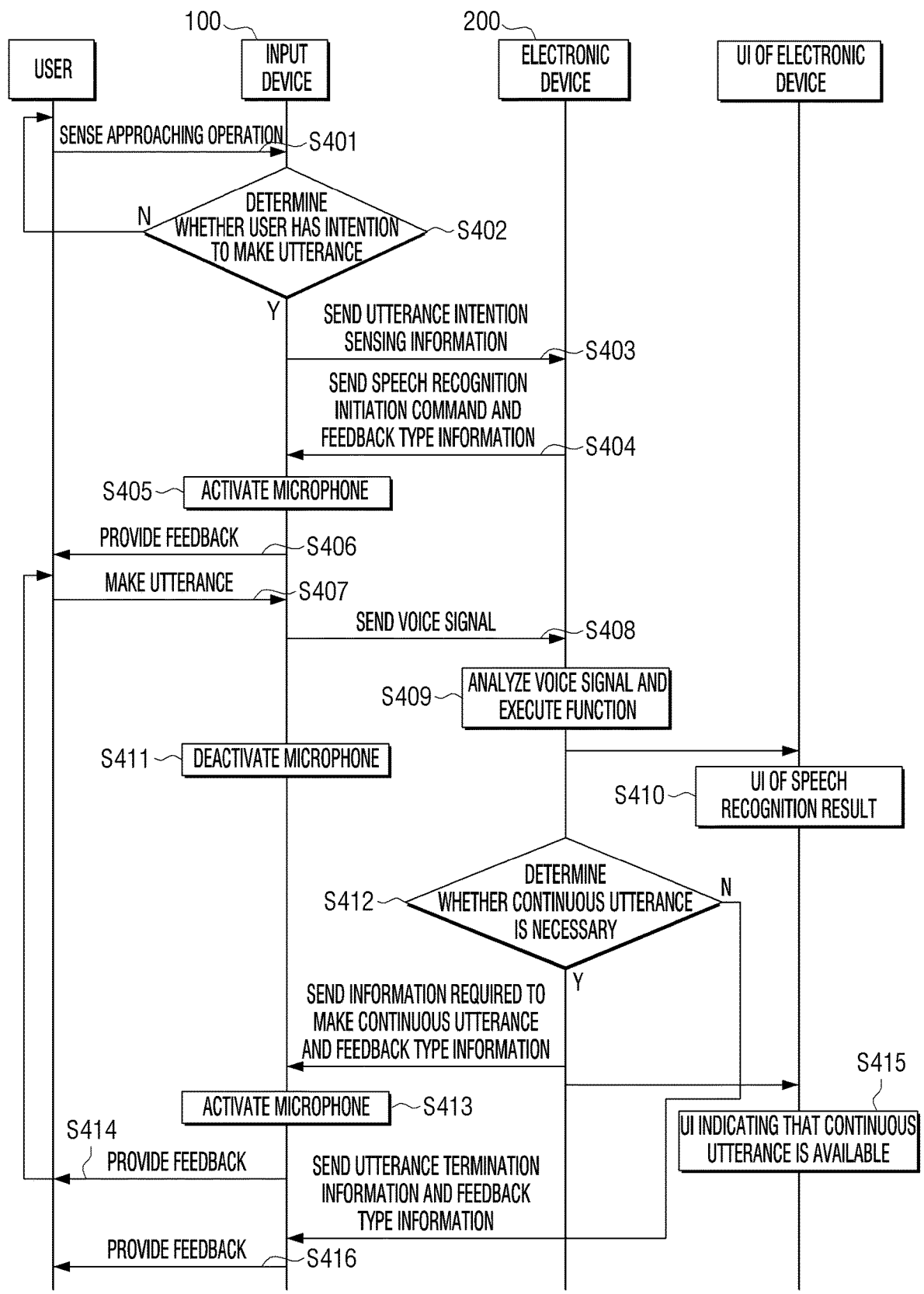
FIG. 4 is a sequence diagram for explaining an input device and a mutual operation of an electronic device, according to an example embodiment.

FIG. 4 is a sequence diagram for explaining an input device and a mutual operation of an electronic device, according to an example embodiment.

When a user approach for the input device 100 is detected at operation S401, the input device 100 may determine whether a user has intention to make utterances. When a user's operation is a grip operation, the input device 100 may determine that the user has intention to make utterances, at operation S402—N. When a user's operation is one of a hovering operation, a swiping operation and a touch operation, the input device 100 may determine that a user has intention to make utterances, at operation S402—Y, and transmit utterance intention sensing information to the electronic device 200, at operation S403.

The electronic device 200 may transmit a speech recognition initiation command and feedback information (including a type of feedback information in an embodiment) to the input device 100, at operation S404. In this regard, the speech recognition initiation command may be a command to activate the microphone so that the speech recognition is available. The feedback information may include at least one of a type of feedback corresponding to information indicating a state in which the speech recognition is available, a pattern according to the feedback type, and an intensity according to the feedback type. For example, the feedback type indicating a state in which the speech recognition is available may be a type that emits an LED light source. For the pattern according to the feedback indicating a state in which the speech recognition is available, only a particular LED light source from among a plurality of LED light sources may emit light. For the intensity according to the feedback type according to a state in which the speech recognition is available, the LED light source may emit light at one of the stages classified by dividing the intensity of the emitted LED light source.

When a speech recognition initiation command and feedback type information are received, the input device 100 may activate the microphone 102, at operation S405, and provide feedback indicating a state in which the speech recognition is available, at operation S406. When the user makes utterances toward the input device 100, while the user utterance is maintained, the input device 100 may provide feedback indicating that a state in which the user utterance is maintained. For example, the input device 100 may control a plurality of LED light sources to sequentially emit light and then, to sequentially stop emitting light to indicate a state in which the user's utterance is maintained.

The input device 100 may transmit a voice signal received through the microphone 120 to the electronic device 200, at operation S408. In an embodiment, the processor 140 of the input device 100 may transit the voice signal received via the microphone 120 to the electronic device 200. In this regard, the voice signal may be a recording data recorded via the microphone 120. For example, in a case in which the user utters a speech "MBC", the utterance may be recorded via the microphone 120 and the recorded data may be transmitted to the electronic device 200. However, the example is not limited thereto, and the input device 100 may analyze the speech "MBC" uttered by the user and transmit the corresponding signal to the electronic device 200.

The electronic device 200 may analyze a voice signal received from the input device 100 and execute a function corresponding to the voice signal. However, when a voice uttered by the user is analyzed in the input device 100 and the corresponding signal is received, the electronic device 200 may execute the corresponding function. A UI of the electronic device 200 may display a UI according to the speech recognition result, at operation S410. For example, when the user utters a speech "MBC", a UI of the electronic device 200 may display "MBC channel".

The input device 100 may transmit a voice signal to the electronic device 200 and then, deactivate the microphone 120, at operation S411. In addition, in a case in which an additional voice signal has not been received for a predetermined time after the voice signal is received, the input device 100 may deactivate the microphone 120. In detail, the input device 100 may initiate sound recording and record a speech uttered by the user, and when an additional voice signal is not received from a predetermined time from when a speech received in the microphone 120 becomes less than a predetermined decibel, that is, a voice of over a predetermined decibel is not detected, determine that the user's utterance has been ended and deactivate the microphone 120. Alternatively, the input device 100 may analyze a speech uttered by the user, and when it is determined that the analyzed speech is a voice signal capable of controlling the electronic device 200, transmit a signal corresponding to the speech to the electronic device 200 and then, deactivate the microphone 120.

The electronic device 200 may determine whether a continuous utterance is necessary according to the received voice signal, at operation S412. When it is determined that a continuous utterance is necessary, the electronic device 200 may transmit information required for continuous utterance and information relating to a feedback type, at operation S412—Y. The input device 100 may activate the microphone 120 according to the information required for continuous utterance, at operation S413, and provide feedback according to the feedback type information, at operation S414. The feedback according to a situation where an additional speech recognition is necessary may be a different feedback from feedback according to the speech recognition initiation command. For example, the feedback according to the situation in which the additional speech recognition is necessary may be a pattern in which a particular LED light source to emit light.

In addition, when it is determined that a situation is that a continuous utterance is necessary, the information indicating that the continuous utterance is available may be provided on the UI of the electronic device 200, at operation S415. For example, when the user utters only a speech "news channel", a list of channels corresponding to "news channel" may be provided on the UI and a text indicating that the situation is that an additional utterance is necessary may be provided.

When it is determined that a continuous utterance is not necessary, the electronic device 200 may transmit utterance end information and feedback type information to the input device 100, at operation S412—N. The input device 100 may provide feedback indicating that the speech recognition is not available, at operation S416. For example, the input device 100 may not output each of a plurality of LED light sources to indicate a state in which the speech recognition is not available.

Figure 5A:
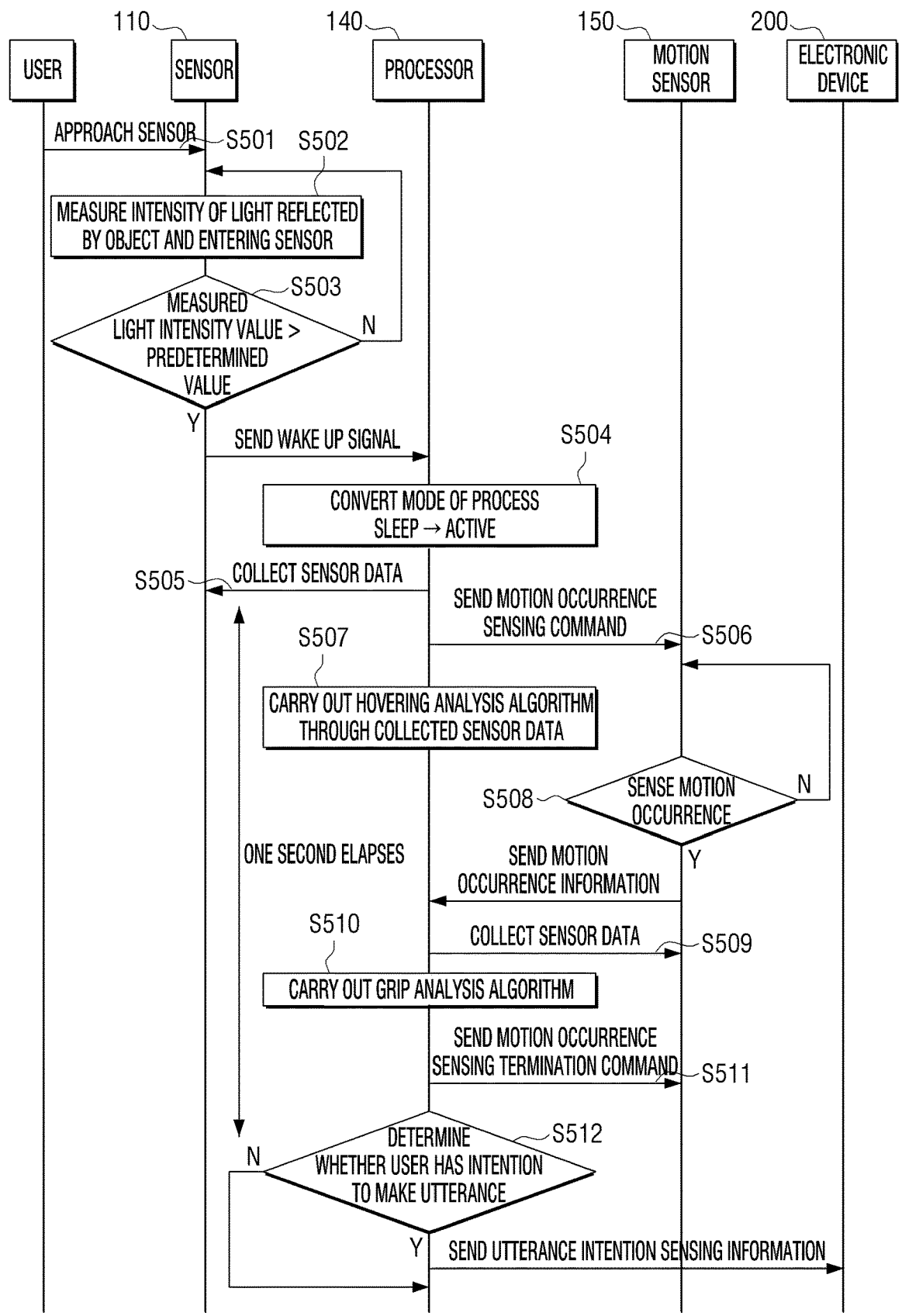
FIGS. 5A and 5B are sequence diagrams for explaining a hovering operation, according to an example embodiment.
Figure 5B:
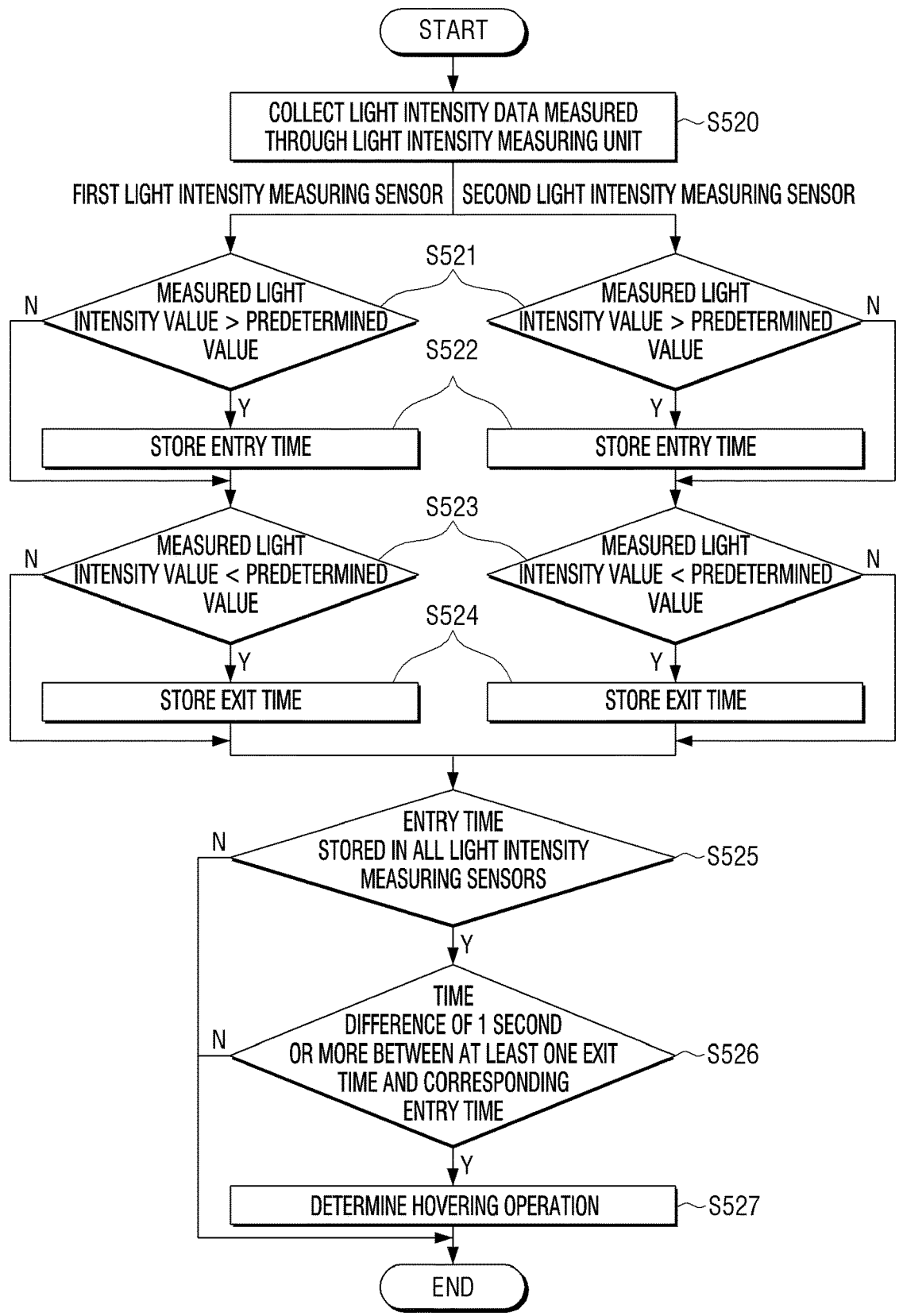

FIGS. 5A and 5B are sequence diagrams for explaining a hovering operation, according to an example embodiment.

FIG. 5A is a diagram illustrating, in detail, a step of determining whether a user has intention to make utterances, operation S402, according to the approaching operation S401 of FIG. 4.

Referring to FIG. 5A, when a user's approach for the input device 100 is detected at operation S501, the sensor 110 may measure an intensity of light that is output from the light output unit 112, reflected by an object (e.g., a user's hand) and entered, at operation S502. In detail, the light intensity measuring unit 114 may measure an intensity of light. In a case in which a light intensity value measured in the light intensity measuring unit 114 is less than a predetermined value, the sensor 110 may measure again an intensity of light that is reflected by the object and entered, at operation S503—N. In a case in which the measured light intensity value is larger than a predetermined value, the sensor 110 may transmit a wake up signal to the processor 140, at operation S503—Y. When a wake up signal is received from the sensor 110, the processor 140 may convert a sleep mode, which is a low power mode, to an active mode, at operation S504, and collect sensing data from the sensor 110, at operation S505. In addition, the processor 140 may transmit to the motion sensor 150 a command to detect whether a motion of the input device has occurred, at operation S506.

The processor 140 may carry out a hovering analysis algorithm through sensing data collected from the sensor 110, at operation S507. In this regard, the hovering analysis algorithm is an algorithm which determines whether a user operation for the input device 100 corresponds to a hovering operation, which will be described in greater detail with reference to FIG. 5B. The motion sensor 150 may determine whether a motion of the input device 100 has occurred, and when the motion is sensed, transmit motion occurrence information to the processor 140, at operation S508—Y.

In a case in which the motion occurrence information is received, the processor 140 may collect sensing data from the motion sensor 150, at operation S509, and carry out a grip analysis algorithm based on the collected sensing data, at operation S510. In this regard, the sensing data collected from the motion sensor 150 may include a value of at least one of an accelerometer sensor and a gyroscope sensor. The grip analysis algorithm is an algorithm which determines whether a user has gripped the input device 100, which will be described in greater detail with reference to FIG. 8.

After a predetermined time (e.g., a second) elapses after the mode is converted to the active mode, when it is determined that the user has not gripped the input device 100, the processor 140 may transmit a motion occurrence sensing suspension command to the motion sensor 150, at operation S511, and determine whether the user has intention to make utterances, at operations S512 and S402. In a case in which the hovering operation is maintained for more than a second and it is determined that the input device 100 has not been gripped, the processor 140 may determine that the user has intention to make utterances and transmit utterance intention sensing information to the electronic device 200, at operations S512—Y and S403. When it is determined that the user does not have intention to make utterances, the processor 140 may collect sensing data again, at operations S512—N, S402—N. However, a time period of a second is merely an example, and the example is not limited thereto.

FIG. 5B is a diagram illustrating in detail a step of carrying out a hovering analysis algorithm, operation S507, of FIG. 5A.

Referring to FIG. 5B, the processor 140 may collect a light intensity data measured via the light intensity measuring unit 114, at operation S520. At least one light intensity measuring sensor may be included in the light measuring unit 114. In FIG. 5B, it is assumed that two light intensity measuring sensors are provided. When a light intensity value measured in the first light intensity measuring sensor is greater than or equal to a predetermined value, at operation S521—Y, the processor 140 may store "Entry Time", at operation S522. In this regard, the "Entry Time" refers to a time point on which a light intensity value measured in the light intensity measuring unit 114 reaches a predetermined value.

Thereafter, when a light intensity value measured in the first light intensity measuring sensor is less than a predetermined value, at operation S523—Y, the processor 140 may store "Exit Time", at operation S524. In this regard, the "Exit Time" refers to a time point on which a light intensity value measured in the light intensity measuring unit 114 falls less than the predetermined value. The same steps, operations S521-S524, as in the first light intensity measuring sensor may be carried out in the second light intensity measuring sensor as well.

The processor 140 may determine whether "Entry Time" is stored in both the first light intensity measuring sensor and the second light intensity measuring sensor, at operation S525. That is, the processor 140 may determine whether a light intensity value measured in the first light intensity measuring sensor and the second light intensity measuring sensor is greater than or equal to a predetermined value. When "Entry Time" is stored in the first light intensity measuring sensor and the second light intensity measuring sensor, the processor 140 may determine whether there is a time difference of more than a second between "Exit Time" in at least one light intensity measuring unit and "Entry Time" of the corresponding light intensity measuring unit, at operations S525—Y and S526. When it is determined that there is a time difference of greater than or equal to a second between "Exit Time" in at least one light intensity measuring unit and "Entry Time" of the corresponding light amount measuring unit, the processor 140 may determine a user's operation as a hovering operation, at operation S527.

Figure 6A:
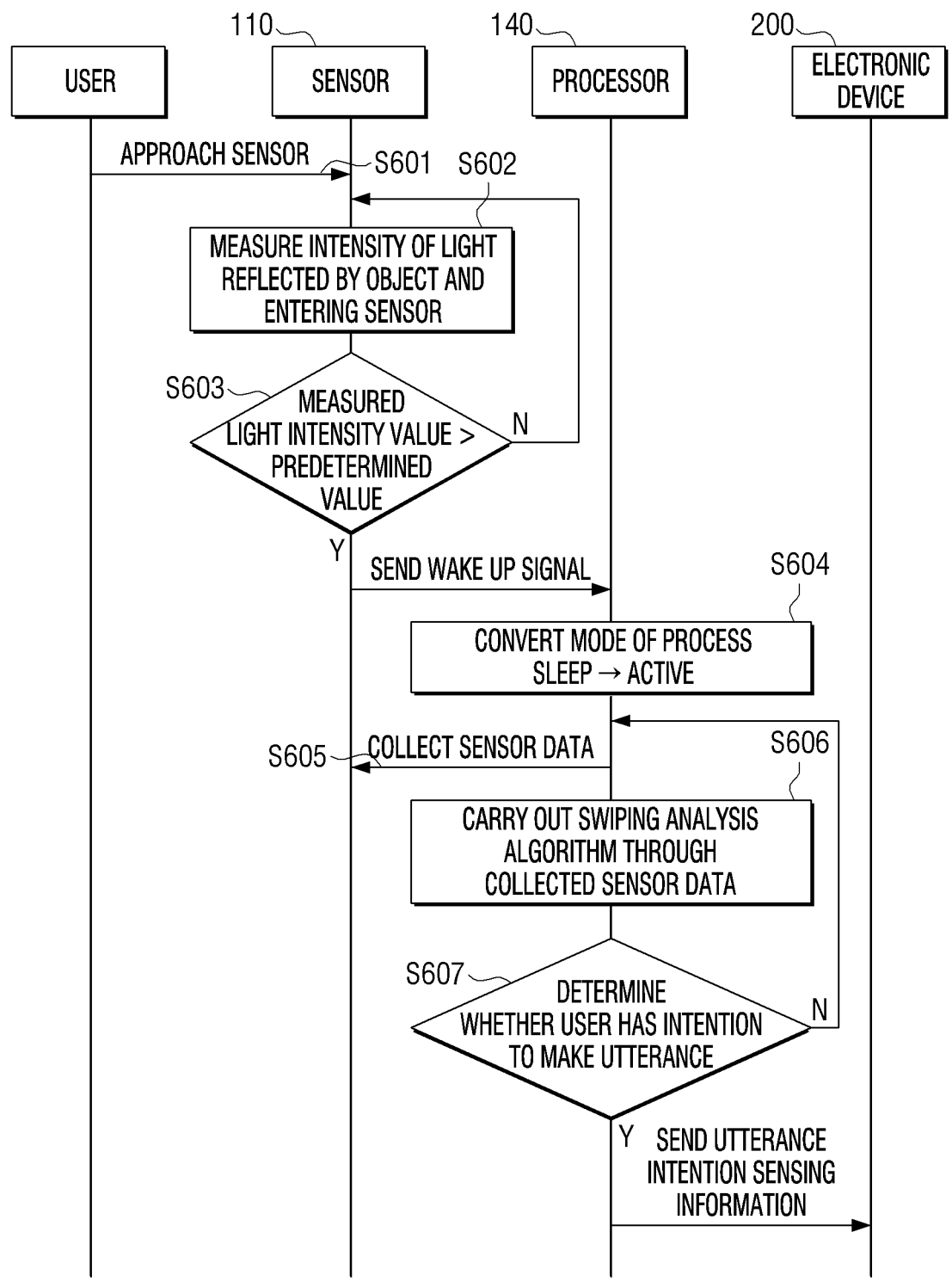
FIGS. 6A and 6B are sequence diagrams for explaining a swiping operation, according to an example embodiment.
Figure 6B:
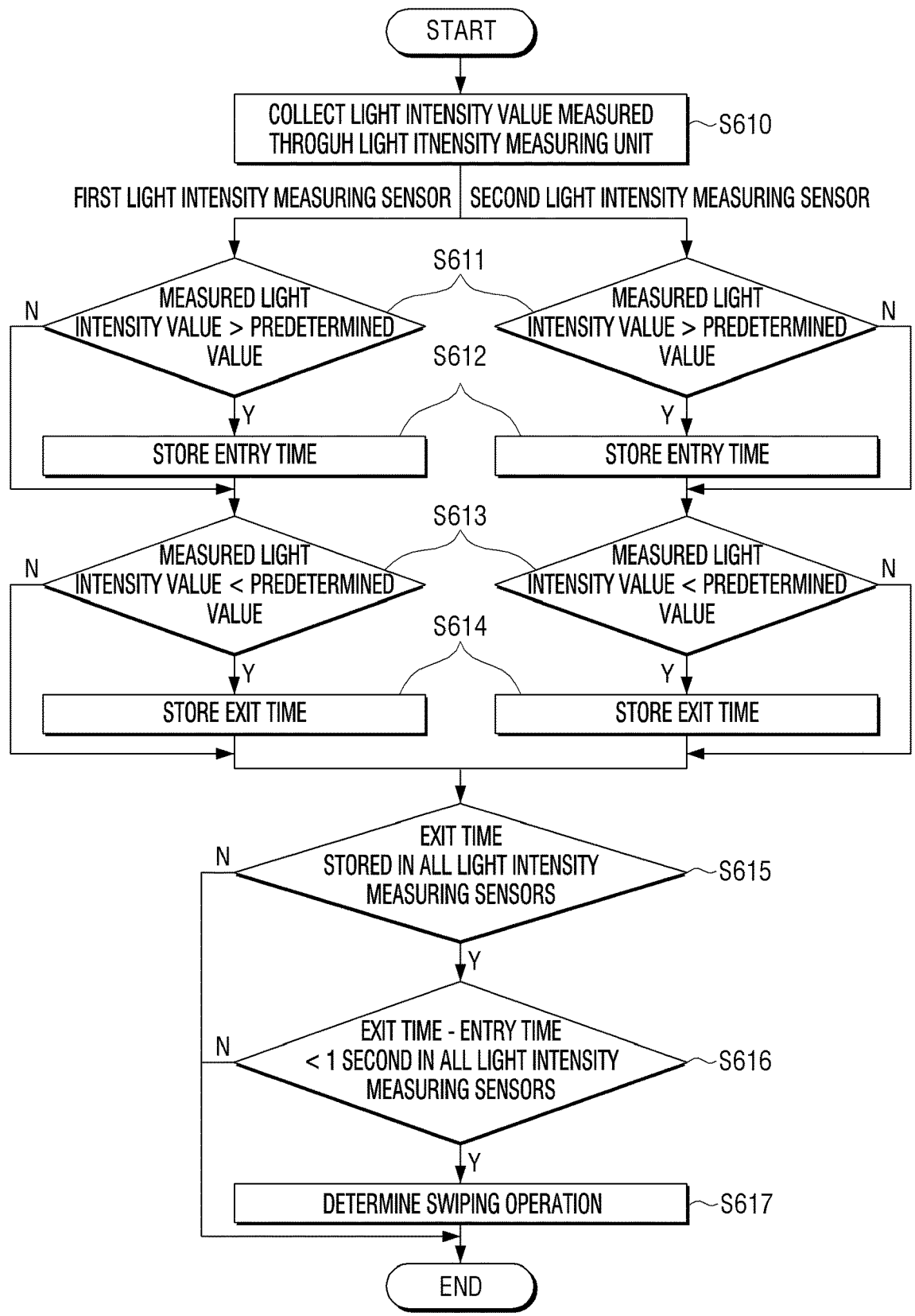

FIGS. 6A and 6B are sequence diagrams for explaining a swiping operation, according to an example embodiment.

FIG. 6A is a diagram illustrating, in detail, a step of determining whether a user has intention to make utterances, operation S402, according to carrying out of the approaching operation S401 of FIG. 4.

Referring to FIG. 6A, when a user carries out an approaching operation toward the input device 100, at operation S601, the sensor 110 may measure an intensity of light that is output from the light output unit 112, reflected by an object (e.g., a user's hand) and entered, at operation S602. In detail, the light intensity measuring unit 114 may measure an intensity of light. In a case in which a light intensity value measured in the light intensity measuring unit 114 is less than a predetermined value, the sensor 110 may measure again an intensity of light that is reflected to the sensor by the object and entered, at operation S603—N. In a case in which the measured light intensity value is larger than a predetermined value, the sensor 110 may transmit a wake up signal to the processor 140, at operation S603—Y. When a wake up signal is received from the sensor 110, the processor 140 may convert a sleep mode, which is a low power mode, to an active mode, at operation S604, and collect sensing data from the sensor 110, at operation S605.

The processor 140 may carry out a swiping analysis algorithm through sensing data collected from the sensor 110, at operation S606. In this regard, the swiping analysis algorithm may be an algorithm which determines whether a user operation for the input device 100 corresponds to a swiping operation. In a case in which it is determined that the user's operation is a swiping direction according to the swiping analysis algorithm, the processor 140 may determine that the user has intention to make utterances and transmit utterance intention sensing information to the electronic device 200, at operations S607—Y and S403. When it is determined that the user does not have intention to make utterances, the processor 140 may collect sensing data again, at operations S607—N, S402—N.

FIG. 6B is a diagram illustrating in detail a step of carrying out a swiping analysis algorithm, operation S606, of FIG. 6A.

Referring to FIG. 6B, the processor 140 may collect a light intensity data measured via the light intensity measuring unit 114, at operation S610. At least one light intensity measuring sensor may be included in the light measuring unit 114. In FIG. 6B, it is assumed that two light intensity measuring sensors are provided. When a light intensity value measured in the first light intensity measuring sensor is greater than or equal to a predetermined value, at operation S611—Y, the processor 140 may store "Entry Time", at operation S612. In this regard, the "Entry Time" refers to a time point on which a light intensity value measured in the light intensity measuring unit 114 reaches a predetermined value.

Thereafter, when a light intensity value measured in the first light intensity measuring sensor is less than a predetermined value, at operation S613—Y, the processor 140 may store "Exit Time", at operation S614. In this regard, the "Exit Time" refers to a time point on which a light intensity value measured in the light intensity measuring unit 114 falls less than the predetermined value. The same steps, operations S611-S614, as in the first light intensity measuring sensor may be carried out in the second light intensity measuring sensor as well.

The processor 140 may determine whether "Exit Time" is stored in the first light intensity measuring sensor and the second light intensity measuring sensor, at operation S615. That is, the processor 140 may determine whether a light intensity value measured in the first light intensity measuring sensor and the second light intensity measuring sensor is less than a predetermined value. When "Exit Time" is stored in the first light intensity measuring sensor and the second light intensity measuring sensor, the processor 140 may determine whether there is a time difference of less than a second between "Exit Time" in each of the light intensity measuring units and "Entry Time" of the corresponding light intensity measuring unit, at operations S615—Y and S616. When it is determined that there is a time difference of less than a second between "Exit Time" in all light intensity measuring units and "Entry Time" of the corresponding light amount measuring unit, the processor 140 may determine a user's operation as a swiping operation, at operation S617.

Figure 7A:
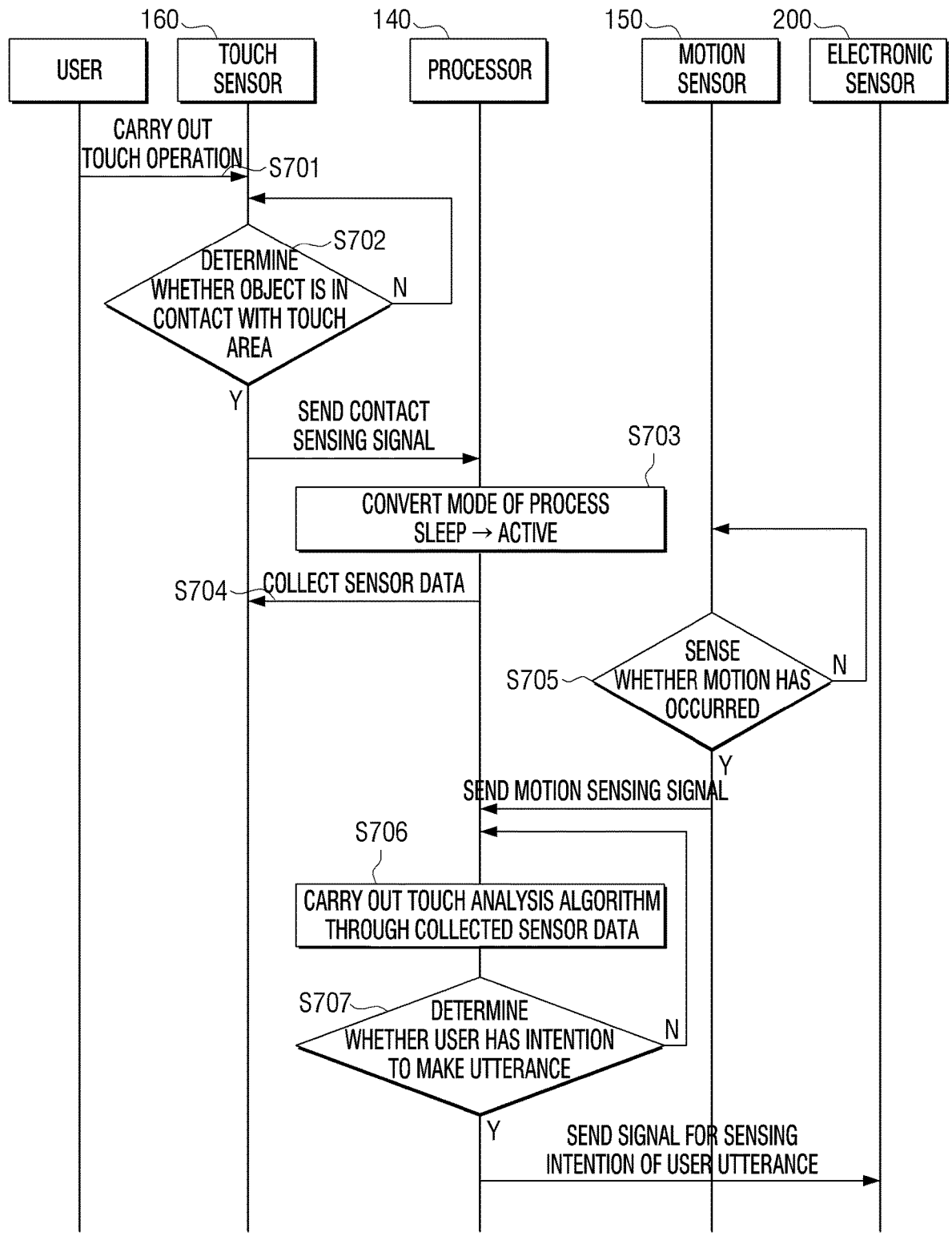
FIGS. 7A and 7B are sequence diagrams for explaining a touch operation, according to an example embodiment.
Figure 7B:
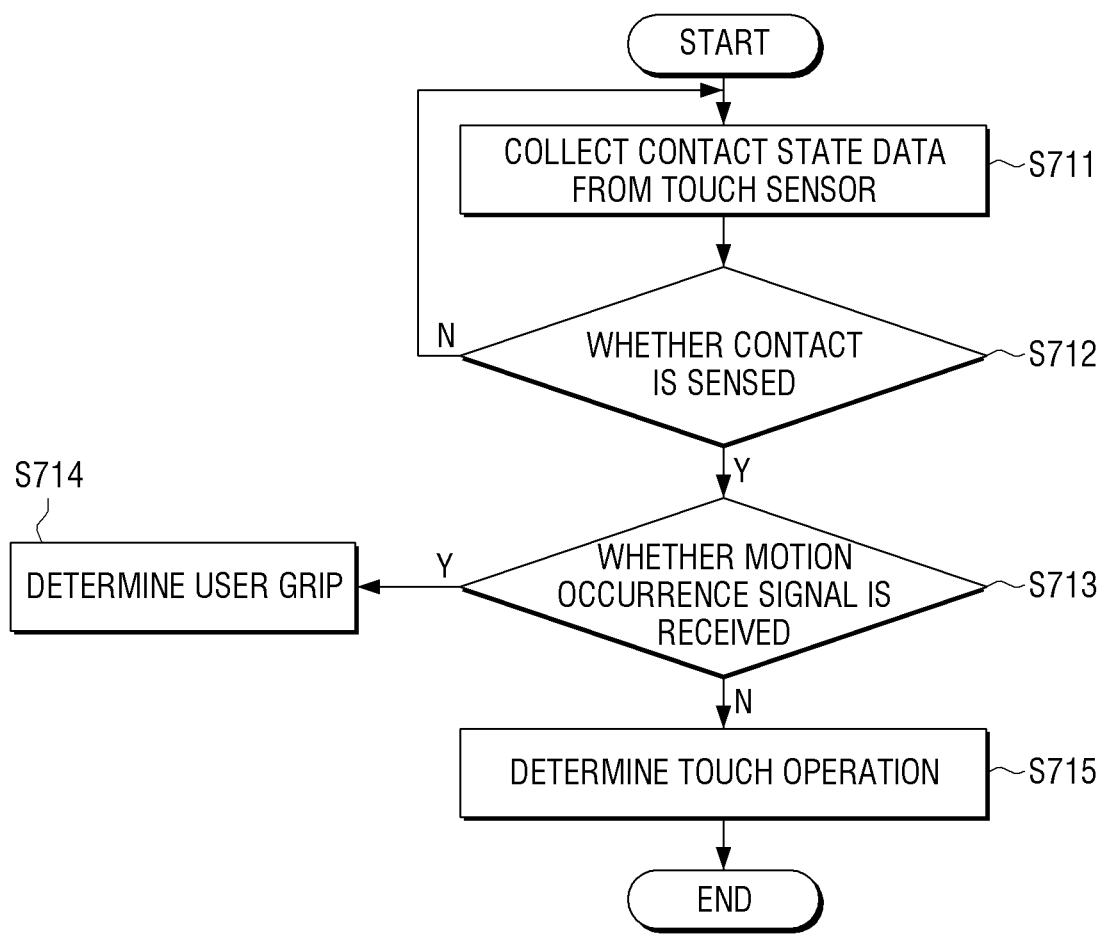

FIGS. 7A and 7B are sequence diagrams for explaining a touch operation, according to an example embodiment.

FIG. 7A is a diagram illustrating, in detail, a step of determining whether a user has intention to make utterances, operation S402, according to carrying out of the approaching operation S401 of FIG. 4.

Referring to FIG. 7A, when the user carries out a touch operation for the input device 100, at operation S701, the touch sensor 160 may determine whether an object (e.g., a user's hand) is in contact with the touch sensor 160, at operation S702. When it is determined that the object is in contact with the touch sensor 160, the touch sensor 160 may transmit a contact sensing signal to the processor 140, at operation S702—Y. When a contact sensing signal is received from the touch sensor 160, the processor 140 may convert a sleep mode, which is a low power mode, to an active mode, at operation S703, and collect sensing data from the touch sensor 160, at operation S704.

The motion sensor 150 may determine whether a motion of the input device 100 has occurred, and when the motion is sensed, transmit a motion sensing signal to the processor 140, at operation S705—Y.

The processor 140 may carry out a touch analysis algorithm based on the collected sensing data, at operation S706. In this regard, the touch analysis algorithm may be an algorithm which determines whether a user operation for the input device 100 corresponds to a touch operation. In a case in which it is determined that the user's operation is a touch direction according to the touch analysis algorithm, the processor 140 may determine that the user has intention to make utterances and transmit utterance intention sensing information to the electronic device 200, at operations S707—Y and S403. When it is determined that the user does not have intention to make utterances, the processor 140 may collect sensing data again, at operations S707—N, S402—N.

FIG. 7B is a diagram illustrating in detail a step of carrying out a touch analysis algorithm, operation S706, of FIG. 7A.

Referring to FIG. 7B, the processor 140 may collect contact status data between an object and the touch sensor 160 from the touch sensor 160, at operation S711. When it is determined that the object is in contact with the touch sensor 160 based on the collected data, the processor 140 may determine whether a motion sensing signal has been received from a motion sensor 150, at operations S712—Y and S713. In a case in which a motion sensing signal has been received, the processor 140 may determine a user's operation with respect to the input device 100 as a grip operation, not a touch operation, at operations S713—Y and S714. In a case in which a motion sensing signal has not been received, the processor 140 may determine a user's operation with respect to the input device 100 as a touch operation, at operations S713—N and S715.

Figure 8:
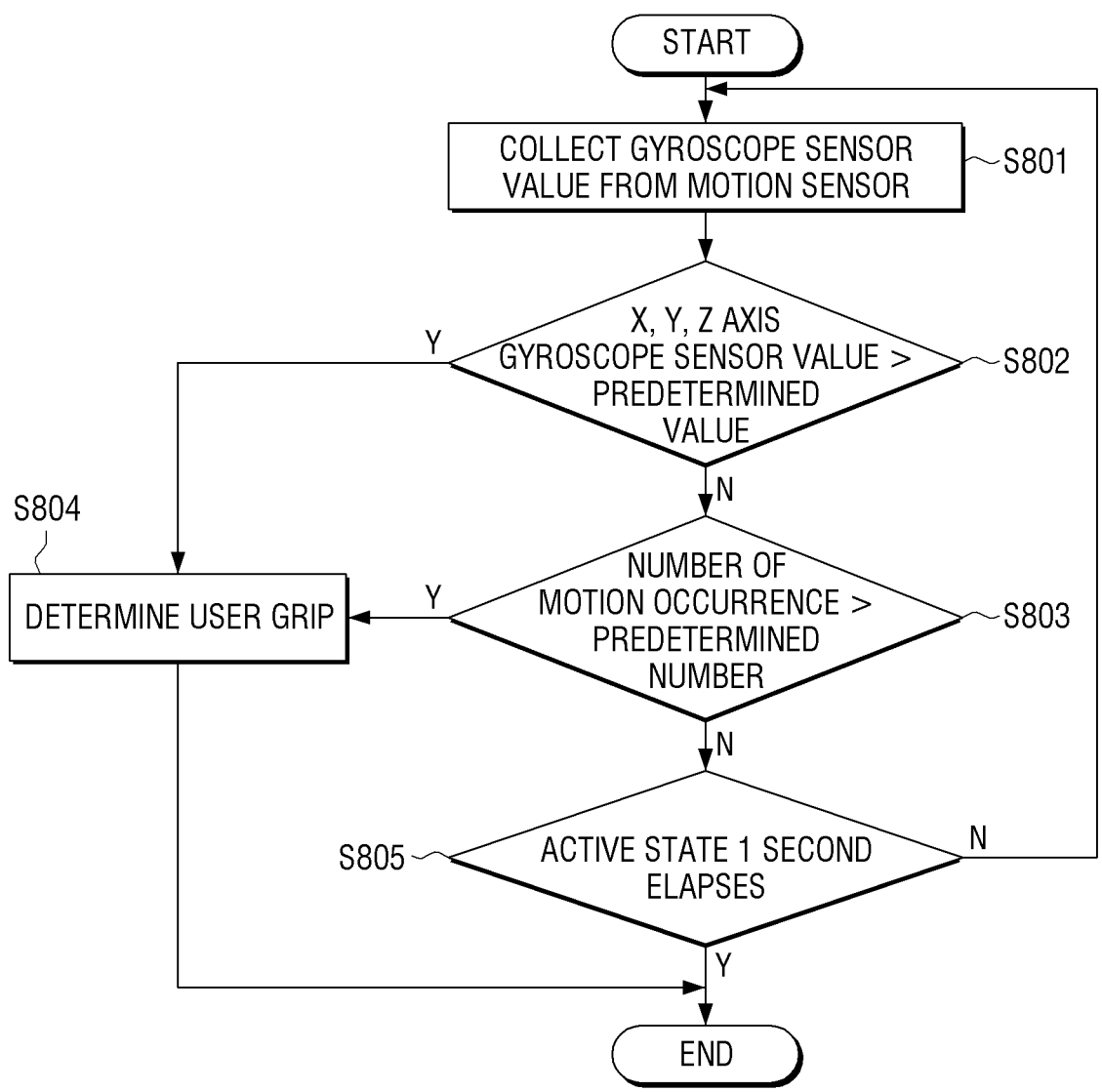
FIG. 8 is a sequence diagram for explaining a grip operation, according to an example embodiment.

FIG. 8 is a sequence diagram for explaining a grip operation, according to an example embodiment.

FIG. 8 is a diagram illustrating in detail a step of carrying out a grip analysis algorithm, operation S510, of FIG. 5A.

Referring to FIG. 8, the processor 140 may collect a gyroscope sensor value from the motion sensor 150, at operation S801. In a case in which X, Y, and Z axis gyroscope sensor values are larger than a predetermined value, the processor 140 may determine that a user's operation for the input device 100 is a grip operation, at operation S804. In a case in which X, Y, and Z axis gyroscope sensor values are not larger than a predetermined value, the processor 140 may determine whether the number of motion occurrences of the input device 100 is greater than or equal to a predetermined number. When the number of motion occurrences is greater than or equal to a predetermined number, the processor 140 may determine that a user's operation for the input device 100 is a grip operation, at operations S803—Y and S804. The processor 140 may repeat the operations S801-S803 from a time point on which the mode is converted to an active mode until a second elapses thereafter.

Figure 9A:
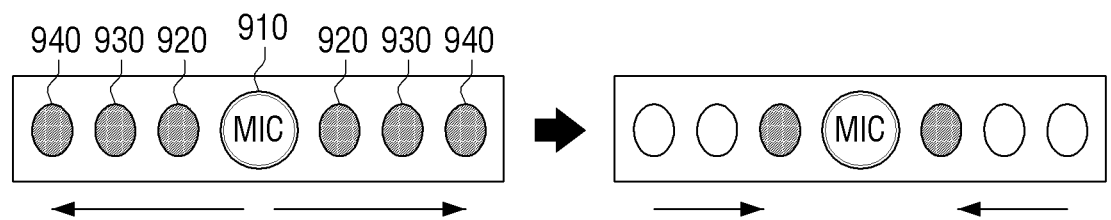
FIGS. 9A to 9C are diagrams illustrating feedback provided by a feedback providing unit, according to an example embodiment.
Figure 9B:
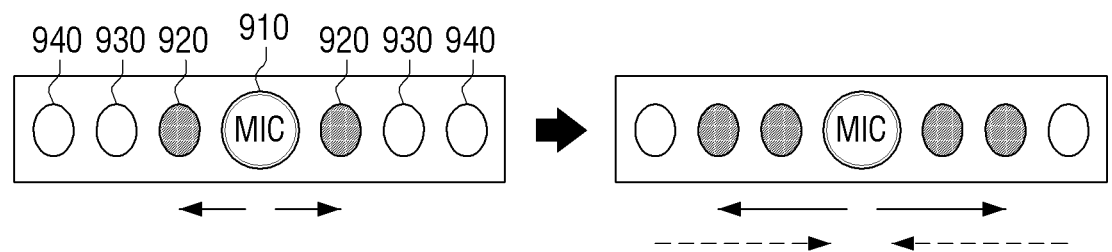
Figure 9C:
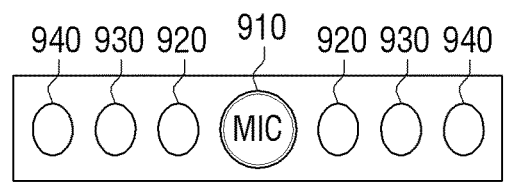

FIGS. 9A to 9C are diagrams illustrating feedback provided by a feedback providing unit, according to an example embodiment.

According to an example embodiment, a plurality of LED light sources 920, 930 and 940 are in a symmetrical shape based on the microphone 910, and each of the LED light sources 920, 930 or 940 in the symmetrical position may simultaneously emit light or simultaneously terminate the light emission.

FIG. 9A is a diagram illustrating feedback indicating a state in which the speech recognition is available.

The state in which the speech recognition is available may be a state in which the speech recognition is initiated according to a hovering operation, swiping operation or touch operation of the user and the voice recognition is available, or may be a state in which the voice recognition is available to indicate that the situation is that it is necessary to receive an additional voice signal.

To indicate a state in which the speech recognition is initiated and the speech recognition is available, the input device 100 may control the LED light source 920 adjacent to the microphone 910 to emit light, control the next LED light source 930 to emit light, and control the farthest LED light source 940 from the microphone 910 to emit light. Thereafter, the input device 100 may control the LED light sources controlled to sequentially emit light toward a direction adjacent to the microphone 910 to terminate the light emission, and maintain only the LED light source 920 closest to the microphone 910 to be in a light emission state.

To indicate that it is necessary to receive an additional voice signal, the same pattern as the LED light emission pattern indicating that the speech recognition has been initiated may be provided. However, unlike the LED light source 920 closest to the microphone 910 being maintained in a light emission state, a pattern that an LED light source continuously emits light and terminates the light emission may be provided.

However, the feedback indicating a state in which the speech recognition is available is not limited thereto. For example, it is possible that the LED light source emits light in a different pattern, that a voice or a sound may be output from the speaker 180, and that the input device 100 may vibrate.

FIG. 9B is a diagram illustrating a state in which a user's utterance is maintained.

The state in which the user's utterance is maintained may be a state in which a voice received via the microphone 910 is of greater than or equal to a predetermined decibel and a voice of greater than or equal to a predetermined decibel is maintained for a predetermined time.

To indicate a state in which the user's utterance is maintained, the input device 100 may control the LED light source 920 adjacent to the microphone 910 to emit light, control the next LED light source 930 to emit light, and control the farthest LED light source 940 from the microphone 910 to emit light. Thereafter, the input device 100 may sequentially terminate the light emission of the LED light sources toward a direction (direction of solid lines) adjacent to the microphone 910 and control the LED light resources to emit light toward a direction (direction of dotted lines) far from the microphone 910 again. This LED light emission pattern may be provided until the user's utterance is ended.

However, the feedback indicating a state in which the user's utterance is maintained is not limited thereto. For example, it is possible that the LED light source emits light in a different pattern, that a voice or a sound may be output from the speaker 180, and that the input device 100 may vibrate.

FIG. 9C is a diagram illustrating a state in which the speech recognition is not available.

The state in which the speech recognition is unavailable may be a case where a user operation to initiate the voice recognition in the input device 100 and it is not necessary to receive an additional voice signal.

To indicate a state in which the speech recognition is not available, the input device 100 may not control the LED light sources 920, 930 and 940 to emit light.

However, the feedback indicating a state in which the speech recognition is not available is not limited thereto. For example, it is possible that the LED light source emits light in a different pattern, that a voice or a sound may be output from the speaker 180, and that the input device 100 may vibrate.

Figure 10:
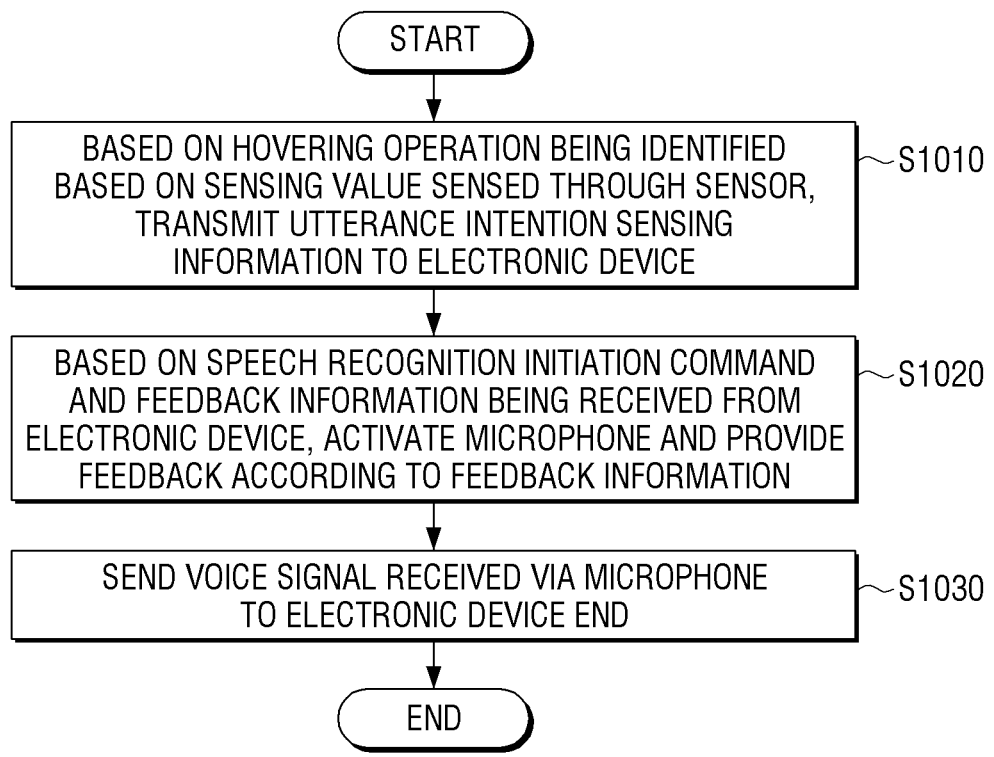
FIG. 10 is a flowchart which illustrates a method for controlling an input device, according to an example embodiment.

FIG. 10 is a flowchart which illustrates a method for controlling an input device, according to an example embodiment.

Referring to FIG. 10, when a hovering operation is identified based on a sensing value sensed through the sensor, the input device 100 may transmit utterance intention sensing information to the electronic device 200, at operation S1010. However, the example is not limited to the hovering operation. The input device 100 may transmit utterance intention sensing information to the electronic device 200 when a swiping or touch operation is identified. In this regard, the utterance intention sensing information may be information indicating that a user's utterance may be started.

When a speech recognition initiation command and feedback information are received, the input device 100 may activate the microphone 120 and provide feedback according to the feedback information, at operation S1020.

Thereafter, the input device 100 may transmit a voice signal received through the microphone 120 to the electronic device 200.

The detailed operation of each of the operations is described above and thus will be omitted herein.

Various exemplary embodiments described above may be embodied in a recording medium that may be read by a computer or a similar apparatus to the computer by using software, hardware, or a combination thereof. In some cases, example embodiments described herein may be implemented by processor itself. According to a software implementation, embodiments such as the procedures and functions described herein may be implemented with separate software modules. Each of the software modules may perform one or more of the functions and operations described herein.

Meanwhile, the computer instructions for carrying out a processing operation according to various embodiments of the present disclosure described above may be stored in a non-transitory computer-readable medium. Computer instructions stored on such non-volatile computer-readable medium may cause a particular device to perform processing operations according to various example embodiments described above when executed by a processor.

The non-transitory computer readable medium refers to a medium that stores data semi-permanently rather than storing data for a very short time, such as a register, a cache, a memory or etc., and is readable by an apparatus. In detail, the aforementioned various applications or programs may be stored in the non-transitory computer readable medium, for example, a compact disc (CD), a digital versatile disc (DVD), and a hard disc. For example, it will be assumed that the light output unit 112 includes a plurality of light sources and that the light intensity measuring unit 114 includes a plurality of light intensity measuring sensors corresponding to the plurality of light sources. The non-transitory computer readable medium may, for example, be a Blu-ray disk, a USB, a memory card, a ROM, or the like.

The foregoing example embodiments and advantages are merely exemplary and are not to be construed as limiting the present disclosure. The present teaching may be readily applied to other types of devices. Also, the description of the example embodiments of the present disclosure is intended to be illustrative, and not to limit the scope of the claims, and many alternatives, modifications, and variations will be apparent to those skilled in the art.

What is claimed is:

1. An input device, comprising:
    a sensor;
    a microphone;
    a communicator; and
    a processor configured to:
        based on an operation of a user having a value sensed through the sensor, transmit utterance intention sensing information to an electronic device,
        based on receiving a command to initiate a speech recognition and feedback information from the electronic device subsequent to the electronic device determining the utterance intention sensing information transmitted to the electronic device indicates intention of the user to activate the microphone according to an utterance of the user and identifying that the feedback information indicates that the electronic device is in a state in which the speech recognition is available, activate the microphone,
        provide a feedback corresponding to the state of the electronic device based on the feedback information,
    wherein the processor is further configured to:
        provide a feedback that is of a different type based on the feedback information received from the electronic device, whereby the feedback of the different type respectively indicates whether the state is in which the speech recognition is available, a state in which the utterance of the user is maintained, and a state in which the speech recognition is unavailable, and transmit a voice signal received via the microphone to the electronic device.

2. The input device as claimed in claim 1, wherein the operation is a hovering operation by the user, and the processor deactivates the microphone after the voice signal is transmitted to the electronic device or when no additional voice signal is received for a predetermined time after the voice signal is received.

3. The input device as claimed in claim 2, wherein the processor activates the microphone, after the microphone has been deactivated, based on information indicating necessity of an additional voice signal to perform the speech recognition being received from the electronic device.

4. The input device as claimed in claim 3, wherein the processor, based on the information indicating necessity of the additional voice signal and corresponding feedback information being received from the electronic device, provides a feedback requesting an additional utterance based on the received corresponding feedback information.

5. The input device as claimed in claim 1, wherein the sensor includes at least one light output member and a light intensity measuring member, and wherein the processor controls the at least one light output member to output light and identifies the operation based on a reflected amount of the output light measured via the light intensity measuring member.

6. The input device as claimed in claim 1, wherein the feedback provided indicates at least one of a first type of feedback in which the speech recognition is available, a second type of feedback in which an utterance of the user is maintained, and a third type of feedback in which the speech recognition unavailable.

7. The input device as claimed in claim 1, wherein the feedback information from the electronic device includes different feedback information corresponding to each of the state in which the speech recognition is available, the state in which an utterance of the user is maintained, and the state in which the speech recognition is unavailable, and wherein the processor provides different feedback corresponding to each state.

8. The input device as claimed in claim 1, wherein the feedback information includes at least one of a type of the feedback, a pattern according to the type of the feedback, and an intensity according to the type of the feedback.

9. A method to control an input device, the method comprising:

transmitting utterance intention sensing information to an electronic device based on an operation of a user having a value sensed through a sensor;

activating a microphone upon receipt of a command to initiate the speech recognition and feedback information from the electronic device subsequent to the electronic device determining the utterance intention sensing information transmitted to the electronic device indicates intention of the user to activate the microphone according to an utterance of the user and identifying that the feedback information indicates that the electronic device is in a state in which the speech recognition is available;

providing a feedback that is of a different type based on the feedback information received from the electronic device, whereby the feedback of the different type respectively indicates whether the state is in which the speech recognition is available, a state in which the utterance of the user is maintained, and a state in which the speech recognition is unavailable; and transmitting a voice signal received via the microphone to the electronic device.

10. The method as claimed in claim 9, wherein the operation is a hovering operation by the user, and the method further comprising:

deactivating the microphone after the voice signal is transmitted to the electronic device, or when no additional voice signal is received for a predetermined time after the voice signal is received.

11. The method as claimed in claim 10, further comprising:

activating the microphone after the microphone has been deactivated, based on information indicating necessity of an additional voice signal to perform the voice recognition being received from the electronic device.

12. The method as claimed in claim 11, further comprising:

providing a feedback requesting an additional utterance based on corresponding feedback information received from the electronic device based on the information indicating necessity of the additional voice signal and the corresponding feedback information being received from the electronic device.

13. The method as claimed in claim 9, wherein the transmitting the utterance intention sensing information comprises outputting light, and identifying the operation based on a reflected amount of the output light.

14. The method as claimed in claim 9, wherein the feedback provided in the providing indicates at least one of a first type of feedback in which the voice recognition is available, a second type of feedback in which an utterance of the user is maintained, and a third type of feedback in which the voice recognition is unavailable.

15. The method as claimed in claim 9, wherein the feedback information from the electronic device includes different feedback information corresponding to each of the state in which the voice recognition is available, the state in which an utterance of the user is maintained, and the state in which the voice recognition is unavailable, and wherein the providing the feedback comprises, based on the feedback information, providing different feedback corresponding to each state.

16. The method as claimed in claim 9, wherein the feedback information includes at least one of a type of the feedback, a pattern according to the type of the feedback, and an intensity according to the type of the feedback.

17. A system including an input device and an electronic device, the system comprising:

an input device configured to, based on an operation of a user having a value sensed through a sensor, transmit utterance intention sensing information to the electronic device; and an electronic device configured to, based on the utterance intention sensing information being received from the input device, transmit a command to initiate a speech recognition and feedback information to the input device, wherein the input device is configured to:

based on receiving the command and the feedback information from the electronic device subsequent to the electronic device determining the utterance intention sensing information transmitted to the electronic device indicates intention of the user to activate a microphone according to an utterance of the user and identifying that the feedback information indicates that the electronic device is in a state in which the speech recognition is available, activate the microphone,
provide a feedback corresponding to the state of the electronic device based on the feedback information,
wherein the input device further configured to:
provide a feedback that is of a different type based on the feedback information received from the electronic device, whereby the feedback of the different type respectively indicates whether the state is in which the speech recognition is available, a state in which the utterance of the user is maintained, and a state in which the speech recognition is unavailable, and
transmit a voice signal received via the microphone to the electronic device.

* * * * *